United States Patent [19]

Rosenquist

[11] Patent Number: 5,367,044
[45] Date of Patent: Nov. 22, 1994

[54] BLOW MOLDED ARTICLE MOLDED FROM A COMPOSITION COMPRISING A RANDOMLY BRANCHED AROMATIC POLYMER

[75] Inventor: Niles R. Rosenquist, Evansville, Ind.

[73] Assignee: General Electric Company, Pittsfield, Mass.

[21] Appl. No.: 928,075

[22] Filed: Aug. 12, 1992

Related U.S. Application Data

[63] Continuation of Ser. No. 596,186, Oct. 12, 1990, abandoned.

[51] Int. Cl.$^5$ .............................................. C08G 64/00
[52] U.S. Cl. ....................................... 528/204; 528/196
[58] Field of Search ................................ 528/204, 196

[56] References Cited

U.S. PATENT DOCUMENTS 4,695,620  9/1987  Masumoto et al. ................. 528/204
4,888,400  12/1989  Boden et al. ......................... 528/204

Primary Examiner—John Kight, III
Assistant Examiner—T. Mosley

[57] ABSTRACT

A composition comprising a randomly branched aromatic polycarbonate polymer wherein the branching agent 1,1,1-tris-(4-hydroxyphenol)ethane is present in the polymer in quantities ranging from about 0.28 to about 0.36 mole percent compound based on the percent of dihydric phenol present in the polymer.

4 Claims, No Drawings

BLOW MOLDED ARTICLE MOLDED FROM A COMPOSITION COMPRISING A RANDOMLY BRANCHED AROMATIC POLYMER

This is a continuation of copending application Ser. No. 07/596,186, filed Oct. 12, 1990, now abandoned.

BACKGROUND OF THE INVENTION

Branched aromatic carbonate polymers have been well known for many years. The branching agents employed are tri-functional or higher molecules which can incorporate within a linear aromatic carbonate polymer chain and have a functional group left for further reaction which provides the branched molecule. Various branching agents have been utilized in polycarbonate to prepare a branched polycarbonate. One of the latest being used is the compound 1,1,1-tris-(4-hydroxyphenyl)ethane.

The utilities for these branched polycarbonates are generally well known and are characterized by their increased melt strength. Such utilities include film, fibers, sheets, tubes, rods and in particular blow molding applications such as bottles and various containers. The previously mentioned compound, abbreviated hereafter as THPE, was used to replace tri mellitic trichloride (TMTC). The latter compound has been used as a branching agent in polycarbonate for many years. However it had the inherent problem of having poor stability to ultra violet radiation. The UV stability of the branched polycarbonate having the THPE therein was substantially increased. However an unforeseen problem was noted in the blow molding application of bottles. The previous branched polycarbonate utilizing the "TMTC" compound had provided excellent materials for the actual bottle application. However the branched polycarbonate with the new compound, THPE, was having serious problems in the field, even though it should have behaved very similarly to its predecessor branched polycarbonate. Specifically in making one gallon containers with branched bisphenol-A polycarbonate utilizing 0.40 mole percent THPE, based on the moles of bisphenol-A present in the polycarbonate, the branched polycarbonate did not process up to performance specifications arrived at using the earlier commercial TMTC branched bisphenol-A polycarbonates. Problems such as entrapped bubbles in the bottles, haze due to flow lines, as well as irregular parisons were observed.

A new formulation was devised to overcome these problems. This formulation utilized a smaller amount THPE. Such formulation did not encounter the previously observed problems with the higher portion of THPE.

SUMMARY OF THE INVENTION

In accordance with the invention there is a composition comprising a randomly branched aromatic polycarbonate wherein the branching agent is 1,1,1-tris- ( 4-hydroxyphenyl ) ethane, present in from about 0.28 to about 0.36 mole percent based on the moles of dihydric phenol present in the aromatic polycarbonate.

DETAILED DESCRIPTION OF THE INVENTION

The method of making the high molecular weight randomly branched polycarbonates is well known in the art. References which show the art accepted methods in making the randomly branched polycarbonates are disclosed in the Reissue 2,7682: U.S. Pat. No. 4,415,722: U.S. Pat. No. 4,415,723: U.S. Pat. No. 4,415,724 and U.S. Pat. No. 4,415,725. The disclosures of each of these references is incorporated by reference in this patent application. In the preparation of the novel randomly branched aromatic carbonate polymers of this invention, the amount of THPE which is utilized in the synthesis of the resin is sufficient to provide in general from about 0.28 to about 0.36 mole percent in the branched polycarbonates, is measured by the dihydric phenol which is present. The amount of THPE is preferably about 0.30 to about 0.34 percent.

The dihydric phenols which are in general reacted with the carbonate precursor and THPE in preparing the randomly branched polycarbonates are well known and are disclosed in the references identified above particularly in reissued 27682 at column 4, line 19 to column 5, line 22 and U.S. Pat. No. 4,415,722 at column 3, line 35 to line 60. Bisphenol-A is preferred.

The carbonate precursor employed can generally be a carbonyl chloride or a haloformate. When utilizing a melt polymerization an aryl carbonate such as diphenyl carbonate can be employed. Thus the carbonyl halide can be carbonyl chloride, carbonyl bromide and mixtures thereof. The haloformates suitable for use include mono or bishaloformates of dihydric phenols (bischloroformates of hydroquinone, monochloroformate of bisphenol-A, etc. ) or bishaloformates of glycols (bishaloformates of ethylene glycol, neopentyl glycol, polyethylene glycol, etc. ). When using bishaloformates equimolar amounts of free dihydric phenols are required to affect polymerization. When polymerizing monohaloformates of diphenols no free diphenols are required. While other carbonate precursors will occur to those skilled in the art, carbonyl chloride, also known as phosgene, is preferred.

Various conventional processing techniques are known in the art to prepare the randomly branched polycarbonates, for example, interfacial solution or melt polymerization. Interfacial polymerization is preferred.

Generally the interfacial polymerization occurs with the utilization of interfacial or phase transfer catalysts. Suitable catalysts include tertiary amines such as triethylamine, tripropylamine, N,N-dimethylanaline and the like. Quaternary ammonium compounds such as tetraethylammonium chloride, cetyl triethylammonium bromide and the like can also be employed.

The specific utility for which randomly branched aromatic polycarbonates of this invention are utilized is in blow molding applications. Bottles in particular are the preferred application. An even more preferred application is a one gallon container blow molded.

In the example below the randomly branched polycarbonate which is substantially free of crosslinking is prepared in the standard manner. In the examples a 0.40 mole percent THPE level was used in the comparison example while a 0.34 mole percent level THPE was used in the example of the invention.

EXAMPLE

A standard 0.40 mole percent randomly branched bisphenol-A polycarbonate with THPE as a branching agent was blow molded into one gallon containers. The containers had productivity issues as illustrated by the entrapment of bubbles in the resin as well as haze due to flow lines and irregularly shaped parisons. The one gallon bottles were then prepared from a randomly branched bisphenol-A polycarbonate having a 0.34 mole percent level of THPE. The prior problems were not observed to any great extent and the bottle was found to be acceptable for marketing purposes. There was nothing predictable about the usage of lower levels of branching agent in the randomly branched aromatic polycarbonate to bring about the removal of the observed problems.

What is claimed is: .

1. A blow molded article which is a bottle molded from a composition comprising a randomly branched aromatic polymer said randomly branched aromatic polymer comprising:

(1) a carbonate precursor.
(2) a dihydric phenol; and
(3) 1,1,1-tris-(4-hydroxyphenyl) ethane as a branching agent;

wherein said branching agent is present in said polymer in a quantity ranging from about 0.28 to about 0.36 mole percent based on the amount of said dihydric phenol present in said polymer.

2. An article in accordance with claim 1 wherein the bottle is adapted to contain one gallon of liquid.

3. The bottle of claim 1 wherein the carbonate precursor comprises bisphenol-A.

4. The bottle of claim 3 wherein the branching agent 1,1,1-tris-(4-hydroxyphenyl)ethane is present in an amount ranging from about 0.30 to about 0.34 mole percent based on the amount of said dihydric phenol present in said polymer.

* * * * *